United States Patent [19]

Pasbrig

[11] Patent Number: 4,718,392
[45] Date of Patent: Jan. 12, 1988

[54] DEVICE FOR PREHEATING LIQUIDS, ESPECIALLY FOR PREHEATING LIQUID FUELS USED FOR COMBUSTION AND FOR POWERING ENGINES

[75] Inventor: Max Pasbrig, Orselina, Switzerland

[73] Assignee: Lacrex Brevetti SA, Orselina, Switzerland

[21] Appl. No.: 900,007

[22] Filed: Aug. 25, 1986

[30] Foreign Application Priority Data

Sep. 10, 1985 [DE] Fed. Rep. of Germany ....... 3532243

[51] Int. Cl.⁴ .......................... F02G 5/00; F02M 15/00
[52] U.S. Cl. ..................................... 123/557; 123/549; 219/205
[58] Field of Search ................. 122/27, 4 R; 123/557, 123/549; 219/205, 207

[56] References Cited

U.S. PATENT DOCUMENTS 4,222,349 9/1980 Kadan et al. ................. 122/20 B
4,512,324 4/1985 Neary ........................... 219/205 X
4,522,712 6/1985 Fischer et al. ................. 123/549 X Primary Examiner—Edward G. Favors

[57] ABSTRACT

A rigid or dimensionally stable insulating casing or jacket has a surface heating element or superficial heating element connected to the inner surface thereof. This insulating casing or jacket and this superficial heating element conjointly form a sturdy or dimensionally stable preheating body or device for preheating liquids, especially for preheating liquid fuels used for combustion and for powering engines. The inner surface of the preheating body or device provides a substantially close fit, at least in the region of the superficial heating element, for accommodating a chamber or vessel for liquids to be preheated, especially for accommodating a filter pot or bowl for fuel used for powering engines. The preheating body or device is advantageously divided into shell segments which are easily mounted or placed about the chamber or vessel for liquids to be preheated.

6 Claims, 2 Drawing Figures

DEVICE FOR PREHEATING LIQUIDS, ESPECIALLY FOR PREHEATING LIQUID FUELS USED FOR COMBUSTION AND FOR POWERING ENGINES

CROSS REFERENCE TO RELATED APPLICATION

This application is related to my commonly assigned, copending U.S. application Ser. No. 06/851,112, filed Apr. 8, 1986 and entitled "Device for Preheating Liquid, for Instance Liquid Fuel".

BACKGROUND OF THE INVENTION

The present invention broadly relates to a new and improved device for preheating liquids, especially for preheating liquid fuels used for combustion and for powering engines.

Generally speaking, the device of the present invention pertains to a new and improved construction of a preheater or preheating device having a thermal-insulating or heat-insulating outer casing or jacket and, as a heat source, a superficial or surface heating element provided on the inner surface thereof.

In the preheater or preheating device of this general kind known from the German Patent No. 3,514,053 corresponding to the aforementioned copending U.S. application Ser. No. 06/851,112, the preheating device forms a superficial or surface heating chamber or space for the passage or through-flow of the liquid to be preheated. This heating chamber or space serves as a heat exchanger. The boundary surfaces of this heat exchanger are formed of heat-conducting metal walls. A superficial or surface heating element in the shape of a heating foil or a heating mat butts or rests directly against the outer wall of the heating chamber. This superficial heating element in turn is insulated and protected towards the outside by an insulating wall, a metal casing or housing, and an additional outer insulation or insulating covering. This preheater or preheating device advantageously comprises a bowl or pot-shaped casing or jacket. Upon this bowl or pot-shaped casing or jacket there is threadably attached a cover possessing the connecting channels for the heating chamber. If the cylindrical inner wall of the heating chamber of this bowl or pot-shaped casing or jacket comprises a sufficiently large hollow space or cavity, then a filter for liquids can be installed in the inner portion of this bowl or pot-shaped casing or jacket such that the preheater or preheating device and the filter for liquids form a structural unit.

SUMMARY OF THE INVENTION

Therefore, with the foregoing in mind, it is a primary object of the present invention to provide a new and improved construction of a preheating device which effectively preheats a liquid, especially a liquid fuel.

Another and more specific object of the present invention aims at providing a new and improved construction of a preheating device of the previously mentioned type having a thermal-insulating or heat-insulating outer casing or jacket and a heating source.

A further significant object of the present invention is to simplify a preheating device according to the aforesaid German Patent No. 3,514,053 such that the preheater or preheating device can be utilized without modification with commercially available containers or vessels for liquids, such as filters used with fuels for powering engines.

Yet a further significant object of the present invention aims at providing a new and improved construction of a preheating device of the character described which is relatively simple in construction and design, extremely economical to manufacture, highly reliable in operation, not readily subject in breakdown or malfunction and requires a minimum of maintenance and servicing.

Now in order to implement these and still further objects of the invention, which will become more readily apparent as the description proceeds, the preheating device of the present invention is manifested by the features that the outer casing or jacket is formed of a rigid or dimensionally stable insulating jacket or casing upon whose inner surface there is attached a surface heating element or superficial heating element. This superficial heating element comprises at least one free contact surface which is tear resistant and has sufficient contact strength such that it can be brought into contact with another element without being damaged. Furthermore, the insulating casing or jacket and the surface or superficial heating element conjointly form a preheating element or body which is structured for attachment to a container or vessel for liquids to be preheated. The inner surface of this preheating element or body provides a substantially close fit, at least in the region of the superficial or surface heating element, for accommodating this container or vessel for liquids.

A substantial simplification of the preheater or preheating device is achievable by relaxing the requirement that the preheater or preheating device possesses an individual heating space or cavity for the liquid to be preheated. The thermal heating capacity or output of the preheater or preheating device is also sufficient, provided that the surface or superficial heating element is in direct contact with the container or vessel for the liquids to be preheated. Since this preheater or preheating device comprises only a few and simple, easily formable layers or shell segments, the preheater or preheating device can easily be structured to provide a substantially close fit for accommodating any outer surface of a container or vessel for liquids to be preheated. For this reason, this preheater or preheating device is especially suitable as an ancillary device for application or use on commercially available containers or vessels for liquids to be preheated, especially for use on fuel filters for powering engines.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
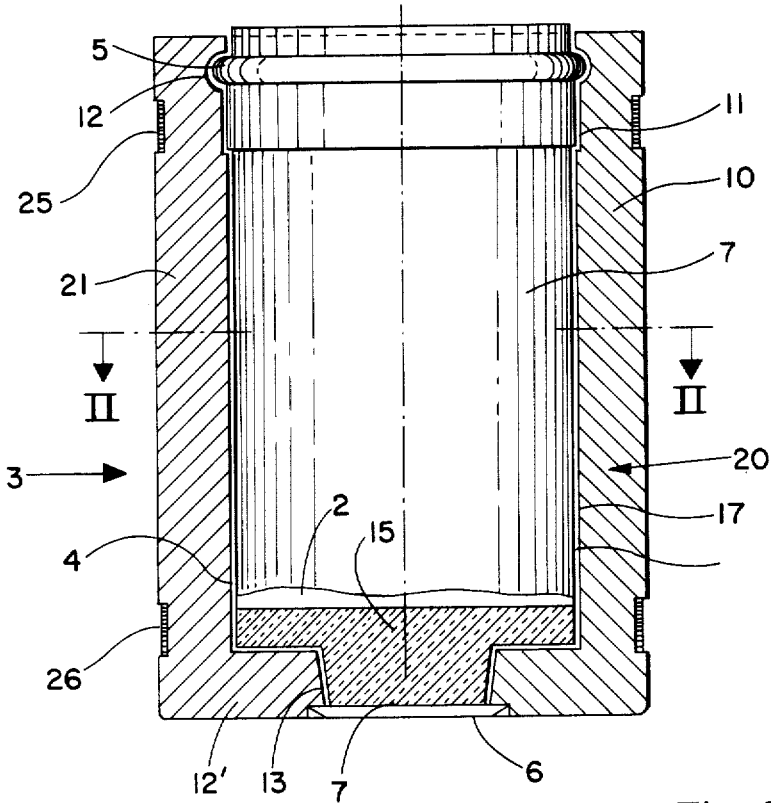
FIG. 1 shows a vertical section taken along the line I—I of FIG. 2 through a preheater or preheating device attached to a fuel filter used with fuels powering an engine.

Describing now the drawings, it is to be understood that to simplify the showing thereof only enough of the structure of the preheater or preheating device has been illustrated therein as is needed to enable one skilled in the art to readily understand the underlying principles and concepts of this invention. Turning now specifically to FIG. 1 of the drawings, the preheater or preheating device 3 illustrated therein by way of example and not limitation, will be seen to be affixed to a commercially available container or vessel, such as a filter bowl or pot 1 used with, for instance, diesel fuel for powering a diesel engine. This filter bowl or pot 1 is, for example, in the form of a replaceable or changeable filter equipped with a water storage space or reservoir 2. This replaceable filter is removeably connected or attached to a terminal or connection head possessing effluent and affluent channels (not shown) for the diesel fuel. A closed filter bowl wall 4 constructed from metal surrounds an inner lying filter device (not shown). The filter wall 4 at its top region possesses attachment means in the form of an annular bead or bulge 5 and at the bottom region an attachment or connection shoulder attachment or connection shoulder 6. This insert or insert member 6 is provided for a water draining or discharge screw (not shown).

According to the invention, the filter bowl or pot 1 is surrounded by an insulating casing or jacket 10 forming an outer casing or jacket. This insulating casing or jacket 10 is made from a thermal insulating foam material such as, for example, polyurethane foam or a similar insulation material. The material of the insulating casing or jacket 10 is densified and the contact surfaces of this insulating casing or jacket 10 are smoothed such that they form a rigid or dimensionally stable and substantially pressure-resistant casing or jacket body.

An inner surface 11 of this insulating casing or jacket 10 provides a substantially close fit for accommodating the periphery or circumferential form of the filter bowl or pot 1. Attachment means in the form of an annular groove 12 in the insulating casing or jacket 10 engages with the annular bead or bulge 5 in the insulating casing or jacket 10 in the insulating casing or jacket 10 at the filter bowl or pot 1 and thus affixes the insulating casing or jacket 10 against axial displacement. If the filter bowl or pot 1 possesses a water draining or discharge opening 7, then a base 12' of the insulating casing or jacket 10 possesses a corresponding recess 13. If the filter pot or bowl 1 is not utilized with water separation or settling, an additional cover or top (not shown) can be placed over the discharge or draining opening 7 which closes or seals the recess 13. In order to fill or occupy the water storage space or reservoir 2, a liner or insert 15 made from plastic or a suitable synthetic material can be inserted if the settling of the water occurs at a different location.

A heating foil or heating mat is attached as the surface or superficial heating element 16 onto the inner surface 11 of the insulating casing or jacket 10, for example is affixed by bonding or adhesion. This surface or superficial heating element 16, defining a heat source, advantageously extends the entire height of the cylindrical section of the insulating casing or jacket 10. Since the insulating casing or jacket 10 is provided with a substantially close fit for accommodating the shape of the filter bowl or pot 1, the surface or superficial heating element 16 rests snugly or tightly on the outer wall 4 of the filter bowl or pot 1. This arrangement assures a good heat flow from the surface or superficial heating element 16 into the inner regions of the filter bowl or pot 1 and thus to the liquid fuel flowing through the filter bowl or pot 1.

The surface or superficial heating element 16 is surrounded by an insulating mass, that is to say by the insulating casing or jacket 10, and is shaped like a foil or mat. In a bonded state the surface or superficial heating element 16 is likewise dimensionally stable and at least on an inner exposed contact surface 17 is also tear resistant and has sufficient contact strength such that it can be brought into contact with another element, such as the filter bowl or pot or container 1, without being damaged. Thus the preheating body or element 20 comprising the insulating casing or jacket 10 and the surface or superficial heating element 16 can also be placed or slipped over the container or vessel, here for instance the filter bowl or pot 1, for the liquids to be preheated. If desired, the superficial heating element 16 may be surrounded by a reflective foil or layer 30 interposed between the superficial heating element 16 and the thermal insulating outer jacket 10.

Figure 2:
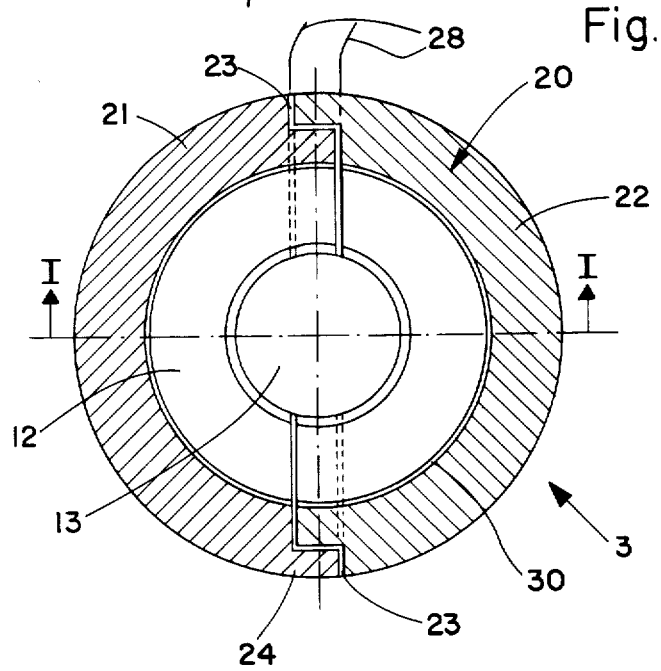
FIG. 2 shows a cross-section taken along the line II—II of FIG. 1 through an insulating casing or housing of the preheater or preheating device.

The attachment of this ancillary device, that is to say the preheater or preheating device 3, onto the filter bowl or pot 1 is facilitated if the preheater or preheating device 3, i.e. the preheating body or element 20, comprises two or more shell segments 21 and 22 (cf. FIG. 2). The contact edges of these shell segments 21 and 22 overlap each other in a step-like manner at contact or joint or abutment surfaces 23 due to the offset or step-like shape of these shell segments 21 and 22 as shown by reference numeral 24 (cf. FIG. 2). In other words at the contact or joint surfaces 23 the shell segments 21 and 22 fit into one another such that a close or tight seal or closure is assured even when the manufacturing tolerances are taken into consideration. The shell segments 21 and 22 are mutually connectable or unitable at the contact or joint surfaces 23, which preferably extend along generatrices of the outer cylindrical surface of the thermal insulating outer jacket 10. The thermal insulating casing or outer jacket 10 advantageously conforms to the profile or outer contour of the filter bowl or pot 1 in order to ensure good thermal contact between the superficial heating element 16 and the filter bowl or pot 1 for good heat transfer therebetween. A respective upper and lower annular band or connecting element 25 and 26, such as tie bands, are provided for connecting these shell segments 21 and 22 in a simple manner about the filter bowl or pot 1. If these annular tie bands or connecting elements 25 and 26 are sufficiently resilient or elastic, they can simply be slipped or pulled over the insulating casing or jacket 10. Should the annular tie bands or connecting elements 25 and 26 be constructed from steel, then it is possible to achieve the necessary tension or resilience by means of a helix or worm thread, i.e. by designing the tie bands in the form of a helix.

Connecting leads 28 for supplying electrical energy to the surface or superficial heating element 16 can be fed through the insulating casing or jacket 10 at any suitable location, however, most advantageously at the abutting or contact surfaces 23 of the shell segments 21 and 22.

The invention is not limited to the exemplary embodiment shown in FIGS. 1 and 2. Moreover, the ancillary device, that is to say, preheater or preheating device 3 according to the invention, can also be formed or shaped to fit or accommodate any other container or vessel for liquids to be preheated and can be placed or mounted thereabout. The insulating casing or jacket 10 itself could comprise several insulating layers or segments. It would also be possible to protect the insulating casing or jacket 10 on the outer or exterior side by means of a protective casing or jacket made from metal or the like. Although the preheating body or element 20 is illustrated in FIGS. 1 and 2 as having a substantially cylindrical shape, other cross-sectional shapes, such as rectangular, square, or oval, are not to be excluded. The preheating body or element 20 could also comprise only one or several sheet or plate elements.

While there are shown and described present preferred embodiments of the invention, it is to be distinctly understood that the invention is not limited thereto, but may be otherwise variously embodied and practiced within the scope of the following claims. Accordingly,

What I claim is:

1. A device for filtering and preheating liquids, especially for filtering and preheating fuels used for combustion and for powering engines, comprising:
   a filter bowl constituting an exchangeable container for the liquid to be filtered and preheated;
   said filter bowl having a predeterminate outer contour;
   a preheating device;
   attachment means for exchangeably interengaging said filter bowl with said preheating device;
   said preheating device containing a thermal-insulating outer jacket having an inner surface;
   said thermal-insulating outer jacket comprising a substantially rigid, dimensionally stable insulating jacket;
   said preheating device further containing a heat source comprising a superficial heating element provided at said inner surface of said thermal-insulating outer jacket;
   said superficial heating element comprising at least one exposed and substantially tear-resistant contact surface contacting said filter bowl without being damaged during an exchange of said filter bowl; and
   said inner surface of said thermal-insulating outer jacket, at least in the region of said superficial heating element, substantially conforming with at least part of said predeterminate outer contour of said filter bowl in order to ensure for good heat transfer between said superficial heating element and the filter bowl.

2. The device as defined in claim 1, wherein:
   said preheating body being formed in the shape of a bowl and having a substantially cylindrical section; and
   said superficial heating element being arranged at the region of said substantially cylindrical section of said preheating body.

3. The device as defined in claim 1, wherein:
   said thermal-insulating outer jacket is constructed from a foam-like thermal insulation material.

4. A device for preheating liquids, especially for preheating fuels used for combustion and for powering engines, comprising:
   a thermal-insulating outer jacket having an inner surface;
   said thermal-insulating outer jacket comprising a substantially rigid, dimensionally stable insulating jacket;
   a heat source comprising a superficial heating element provided at said inner surface of said thermal-insulating outer jacket;
   said superficial heating element comprising at least one exposed and substantially tear-resistant contact surface capable of being brought into contact with a container for liquids to be preheated without being damaged;
   said thermal-insulating outer jacket and said superficial heating element conjointly forming a preheating body structured for attachment to the container for liquids to be preheated;
   said inner surface of said thermal-insulating outer jacket at least in the region of said superficial heating element conforming with at least part of an outer contour of said container for liquids to be preheated in order to ensure for good heat transfer between said superficial heating element and the container;
   said preheating body comprising joint surfaces and being divided by said joint surfaces into at least two shell segments; and
   said shell segments being structured such that they are connectable with one another along generatrices of an outer surface of said thermal-insulating outer jacket.

5. The device as defined in claim 4, further including:
   connecting elements for affixing said at least two shell segments of said preheating body to said container for liquids to be preheated.

6. The device as defined in claim 1, further including:
   a reflective foil arranged between said superficial heating element and said thermal-insulating outer jacket.

* * * * *

UNITED STATES PATENT AND TRADEMARK OFFICE
CERTIFICATE OF CORRECTION

PATENT NO. : 4,718,392

DATED : January 12, 1988

INVENTOR(S) : MAX PASBRIG

It is certified that error appears in the above-identified patent and that said Letters Patent is hereby corrected as shown below:

Column 3, line 44, please delete "in the insulating casing"

Column 3, line 45, please delete "or jacket 10 in the insulating casing or jacket 10"

Column 4, line 39, please replace "unitabIe" by --unitable--

Signed and Sealed this

Fourteenth Day of June, 1988

Attest:

DONALD J. QUIGG

Attesting Officer      Commissioner of Patents and Trademarks